Patented Apr. 29, 1930

1,756,574

UNITED STATES PATENT OFFICE

JOKICHI TAKAMINE, DECEASED, LATE OF PASSAIC, NEW JERSEY, BY CAROLINE TAKAMINE, ADMINISTRATRIX, OF NEW YORK, N. Y., AND JOKICHI TAKAMINE, JR., OF CLIFTON, NEW JERSEY, AND NOBUCHIKA FUJITA, OF TOKYO, JAPAN, ASSIGNORS TO TAKAMINE FERMENT COMPANY, OF NEW YORK, N. Y., A CORPORATION OF WEST VIRGINIA

VITAMINE PRODUCT AND PROCESS OF OBTAINING THE SAME

No Drawing. Application filed April 18, 1924. Serial No. 707,543.

This invention relates to vitamine products, and particularly such products of the water-soluble character, and the process of obtaining the same.

The object of the invention is to obtain vitamine products, particularly of the water-soluble variety, in a substantially chemically pure state, and in a simple, efficient and economical manner.

A further object is to obtain such products from the propagation of vegetable fungi.

A further object is to combine protein containing material such as cereals, grains, soya beans, and the like, or the husks, brans, germs and other portions thereof, particularly the germs of wheat and other grain, containing or having vitamine products, with vegetable fungus growths containing or producing the like products, and to obtain therefrom for use the combined vitamine products thereof.

The invention consists substantially in the mode of operation and product as well be hereinafter more fully set forth and finally pointed out in the appended claims.

It has long been known that vitamines of the water-soluble variety are quire widely distributed throughout various natural products, such as the protein-containing materials of the cereals, soya bean, vegetables, and the like, and particularly in the bran, husk or covering portions of cereals and grain of various kinds, and the germs of such grains as wheat, corn, rye, &c. However, notwithstanding such wide distribution of this vitally important agent, but little progress has been made in isolating and obtaining the same in a substantially pure state.

We have discovered that by suitable operations hereinafter to be set forth, this vitamine product can be obtained in a substantially pure state for use for any purpose to which such product is adapted.

We have also discovered that vegetable fungus growths likewise develop or acquire the like properties of water-soluble vitamines, which, by suitable operations, can be obtained in a substantially pure state. And we have discovered that by employing the husks, bran germs or other protein-containing portions of wheat or other grain, or cereals, soya bean, alfalfa, clover, timothy and the like, as a culture medium upon which the vegetable fungus is propagated, and then extracting with water the mass including the culture medium and the propagated fungus, an extract is obtained which contains, among other things, the water-soluble vitamine constituent, not only of the original culture medium, but also that of, acquired by or produced in the propagated fungus, and that by suitably treating this extract the vitamine products may be recovered therefrom in a substantially pure state.

We have found that the matured spores of various fungi may be employed in carrying out our invention, such as the spores of the genera Aspergillus and Penicillium, and possibly others, and we find the spores of various species of Aspergillus suitable for our purposes, such as *Aspergillus roquefort*, and particularly Aspergillus Oryzæ. Broadly, therefore, we desire to include the seed spores of vegetable fungi generally.

Various media may be employed upon which to grow the fungus. We have found that protein-containing material of various kinds, such as grains, vegetables, soya bean cake, dried brewers' or distillers' grain, the residue from starch, sugar, and glucose factories, and the like, are suitable material to employ, and particularly the bran, hulls, germs, middlings, shorts, &c., of wheat and other cereals and grains, alfalfa, clover, timothy, or mixtures of said various materials, well answer the purpose, not only because they afford a cheap and efficient culture medium for the fungus growth, but also because they contain water-soluble vitamines which are extracted along with the vitaminic principle developed in or acquired by the fungus growth.

The culture medium is prepared by reducing the same, where, from its nature and composition, it is necessary to do so, to approximately the size of wheat bran. The mass is then moistened with water to the extent of from 40% to 60% of its weight, and the moistened mass is sterilized. This may be accomplished by steaming the same for a period of from one to three hours. During this sterilizing operation the mass should be thoroughly stirred in order that the sterilizing steam may reach uniformly every particle of the mass. After sterilizing, the mass is permitted to cool. This cooling down of the mass may be effected in various ways, as may be most convenient, such as stirring the same in the air, by passing a current of cold air through it, or by subjecting the mass to a vacuum at a temperature of from about 90° to 110° F., or otherwise.

The medium, prepared as above indicated, is then inoculated with the desired fungus spores. We prefer to thoroughly mix the fungus spores into the mass so as to distribute the same as uniformly as possible throughout the mass.

The fungus spores are now allowed to germinate and grow under suitable conditions of moisture supply, heat and ventilation. Various methods of propagation may be followed. For illustration, the inoculated mass may be spread upon a clean cement floor in a layer or bed of a thickness ranging from about one to two inches; or, if preferred, the mass may be spread on trays to a depth of from about one to two inches, the trays, having wire gauze or perforated bottoms, being suitably stacked in a chamber in which the desired degree of temperature, humidity and ventilation may be maintained. The above described methods of fungus growth are known as "still growth" methods. If desired, however, the "motion growth" method of propagation may be employed. According to this method, in one illustrative form of embodiment, the mass is placed in revolving cylinders and maintained under the required conditions of temperature, humidity and ventilation to allow the fungus to sprout and grow.

The mass, whether subjected to the "still growth" or to the "motion growth" method should be maintained at a substantially uniform temperature, and we have found a temperature of about 98° F. suitable for the purpose, although, within a fair range of limitation, this temperature may be slightly varied from. A degree of humidity approaching as nearly as possible to saturation should be maintained to secure the best results. In the course of from fifteen to twenty hours of incubation, whatever method of growth is employed, and when the proper conditions of temperature and humidity are observed, the fungus will begin to sprout, that is, thread-like, filamentous, root-like tentacles, or mycelium, will begin to form, with an evolution of heat which causes the temperature of the mass to increase. This requires careful adjustment of the surrounding temperature to maintain a substantially uniform degree of temperature. After a period of growth ranging from forty to sixty hours, it will be found that the enzymic properties acquired by or developed during the growth of the propagating fungus have attained the maximum power. When this point is reached, the growth is arrested. During this period of growth carbonic acid gas is abundantly evolved in the mass, and consequently good ventilation and the supply of fresh air to the mass is necessary to secure the best results.

After the mass has attained its maximum of enzymic power, and the fungus growth is arrested, the mass is permitted to cool down to ordinary room temperature, and then it is extracted with a suitable extracting medium. This may be conveniently accomplished in suitable percolators. According to one method, water may be used as the extracting medium. The water-soluble vitamine products developed in or acquired by the fungus growth, as well as that contained in the culture medium employed, are thus extracted from the mass, along with the water-soluble enzymes and other matters contained therein, and also various insoluble or colloidal matters become detached from the mass and are held in suspension in the water extract.

If desired, the extraction operation may be accomplished in a continuous manner, that is, the extract obtained from one batch or quantity of the mass may be used to extract other fresh batches or quantities of the mass, in successive order, thereby eventually obtaining an extract of the desired degree of concentration or strength. The resulting extract is usually in the form of a brown or amber colored more or less transparent liquid, and, in addition to the water-soluble organic and inorganic matters, such as vitamines, enzymes, &c., it contains more or less insoluble and colloidal matters carried in suspension.

The liquid or extract obtained as above described, is permitted to settle, or it may be filtered, to remove more or less of the substances carried in suspension therein. A suitable inert substance possessing the property of absorbing or securing the vitamines contained in the resulting solution is then added to such solution and thoroughly mixed therein. We have found various substances suitable for this purpose, such as fuller's earth, Florida earth, so-called white earth, and the like, and we have found that about one half of one per cent. to two per cent. of such inert substance is sufficient. The mixture of this absorbing substance into the solution may be accomplished efficiently by thoroughly stirring the solution after the addition thereto of the absorbent substance. The solution which now becomes muddy looking is filtered preferably through a filter press. The filtrate which contains the enzymic substances developed in the propagation of the fungus, is removed, and may be used or subjected to further treatment for use for the various purposes for which such enzymes are adapted. The residue left in the filter contains the vitamine constituent of the solution. This residue is now treated to recover the vitamines therefrom. We have found that the vitamines may be recovered by mixing this filter press residue with a saturated aqueous solution of barium hydrate. After thoroughly stirring this mixture it is allowed to settle and the supernatant liquid is then filtered. The insoluble residue which settles or is filtered out is washed with a fresh quantity of the aqueous solution of barium hydrate, and the resulting liquid is allowed to settle or is filtered and added to the filtered supernatant liquid above referred to. The vitamines pass into solution in the barium hydrate water. The resulting solution is then treated to remove the barium. We have found that this may be accomplished by adding dilute sulphuric acid to the solution until no further precipitation takes place. The solution is then left standing in the filter for, say, twenty-four hours more or less, and is then neutralized. The neutralization may be effected by adding barium carbonate until no more free acid exists in the solution. The solution is now filtered and comprises a liquid which is strong in water-soluble vitamine, although containing some protein matters. This vitamine solution may be employed directly for the uses to which such vitamines are appropriate, or, if desired, it may be concentrated. The concentration thereof may be effected under vacuum.

If desired, the vitamine solution, obtained as above described, may be still further purified in various ways. For this purpose we have found it satisfactory to precipitate therefrom more or less of the protein and inert substances. This is accomplished by adding to the vitamine solution a saturated two-tenths to two per cent. acetic acid solution of acetate of lead which will carry down a portion of the protein and inert matters. The supernatant liquor is then filtered off, and any excess of acetate of lead is removed therefrom. This may be effected by passing hydric sulphide through the solution. The resulting solution is then filtered and, if desired, concentrated by evaporation under vacuum. To the filtered or concentrated product is added four times its volume of 70 per cent. alcohol containing about two-tenths of one per cent. of acetic acid. The resulting liquid is thoroughly stirred and then allowed to stand about two hours. It is then again filtered and concentrated under vacuum. To the resulting residue product is then added acetone, ether or chloroform in sufficient quantity to produce a liquid product, which is thoroughly stirred, and then allowed to stand about three hours. The solvent is then separated out, leaving a syrupy liquid which is ready for use as a vitamine product.

According to another method, the mass of culture medium with the fungus propagated thereon to the stage of development to its maximum enzymic power and after being cooled down to ordinary room temperature, as above described, is extracted in any convenient manner, as, for example, in a suitable percolator, with from twenty to forty per cent. of alcohol. The resulting extract is usually in the form of a brownish or amber colored transparent liquid, and, in addition to the soluble organic and inorganic substances, such as vitamines, enzymes, &c., obtained from the mass, this liquid also contains more or less insoluble and colloidal matters carried in suspension therein. The liquid is permitted to stand to allow the colloidal or insoluble matters to settle, or the liquid may be filtered to effect the separating out and removal of more or less of such matters carried or held in suspension therein. To the supernatant liquid or filtrate is added a sufficient quantity of 95 per cent. alcohol to bring the alcoholic percentage of the liquid up to 70 per cent. to 75 per cent. After thoroughly stirring the mixture, it is allowed to stand, whereupon the enzymes and proteins are precipitated carrying down with them some of the insoluble substances, colloids, suspensoids and the like. The supernatant liquid is then filtered. The residue left in the filter, as well as the precipitate obtained, contains enzymes developed in the propagation of the fungus, and may be collected and used or subjected to further treatment for use for the various purposes for which such enzymes are adapted. The filtrate in the form of an alcoholic solution is now treated to recover or separate out therefrom the vitamines contained therein. One convenient manner of treatment is to add to such solution and thoroughly mix therewith an inert substance which possesses the property of combining with the vitamines contained in the alcoholic solution. We have found various substances suitable for this purpose, including, among others, phosphotungstic acid, and tannic acid. For example, to the vitamine alcoholic solution, acidulated with sulphuric acid, is added a thirty per cent. aqueous solution of phosphotungstic acid solution, and the mixture is thoroughly agitated. The resulting solution, which now becomes turbid, is then filtered, preferably in a centrifugal machine. The filtrate is then removed. The residue left in the filter contains the vitamines which are to be recovered. We have found that the vitamines may be recovered from this residue by mixing an aqueous solution of barium hydrate or barium carbonate therewith, which causes the vitamines to pass into solution in the mixture. After thoroughly stirring the barium hydrate mixture, the supernatant liquid is drawn off and filtered, and is then treated to remove the barium. We have found that this may be accomplished by adding dilute sulphuric acid until no further precipitation takes place. The solution is left standing in the filter for about twenty-four hours, and is then neutralized. This neutralization may be accomplished in various ways. According to one method barium carbonate is added until no more free acid exists in the solution. The solution is then filtered, and the filtrate contains the desired water soluble vitamines, although it also contains some protein matters. This vitamine solution may be employed directly for the uses to which such vitamines are adapted, or, if desired, it may be concentrated under vacuum. If desired, the vitamines obtained in the manner just described may be still further purified by employing acetate of lead and acidified 70 per cent. alcohol, and then using acetone, ether or chloroform, as in the water extraction method above described.

If desired, further purification may be accomplished. We have found it effective, after treating with acetone or ether or chloroform, to add ammoniacal silver nitrate to the solution, which forms a silver compound of vitamine. In place of the silver nitrate we have found that ammoniacal mercuric chloride may be used, in which case vitamine will precipitate as a mercuric compound. The silver, or the mercuric constituent, as the case may be, is then removed from the compound. This is accomplished by decomposing the compound, which we have found is effectively accomplished by passing hydrogen sulphide gas in suspension with water, through the compound. The resulting liquid is filtered and concentrated, if desired, or necessary, and contains the vitamine in substantially pure state, and may be used as such for any purposes for which such product is suited. The expression vitamin products as herein employed refers to the water soluble substances possessing the vitamin elements proper as contained in or developed or acquired by vegetable fungus growth on culture media of a cereal nature.

Having now set forth the objects and nature of our invention, and the method of carrying the same into practical operation, what we claim as new and useful and of our joint invention, and desire to secure by Letters Patent is:

1. The process of obtaining vitamines which consists in developing and propagating vegetable fungus of the genus Aspergillus upon a culture medium, then extracting the vitamine product and other water soluble products contained in the resulting mass, and finally separating the vitamine product from the extract.

2. The process of obtaining vitamines which consists in propagating a vegetable fungus upon a culture medium, then extracting the vitamine product and other water soluble products contained in the resulting mass, then mixing into the extract an inert absorbent substance and precipitating agent, then filtering the solution, and adding to the residue an aqueous solution of barium hydrate, and finally recovering the vitamine product from the resulting solution.

3. The process which consists in propagating a fungus growth upon a culture medium, then extracting the vitamine product and other soluble substances contained in the mass, then mixing into the extract an inert absorbent and precipitating agent, and filtering the resultant solution, then adding barium hydrate to the residue, then removing the barium contained in the resulting solution, and then precipitating with an acetic acid aqueous solution of acetate of lead, and removing the metallic lead from the supernatant liquid, and then separating excess lead with hydrogen sulphite gas.

4. The process which consists in propagating a fungus growth upon a culture medium, then extracting the vitamine product and other soluble substances contained in the mass, then mixing into the extract an inert absorbent substance and filtering the resultant solution, then adding barium hydrate to the residue, then removing the barium contained in the resulting solution, and then precipitating with a saturated acetic acid aqueous solution of acetate of lead, and removing the precipitant from the superatant liquid, then separating out the excess lead with hydrogen sulphite gas, then concentrating and adding alcohol containing acetic acid and filtering the resultant solution, then concentrating and adding to the residue, acetone, ether or chloroform, then removing the soluble inert substance from the residue, and then forming a metallic vitamine compound from the vitamine content of the resulting syrup liquid, and finally removing the metallic element of said compound with hydrogen sulphite gas and water.

5. The process which consists in propagating a fungus growth upon a culture medium, then extracting the vitamine and other soluble substances contained in the mass, then mixing white earth or phosphotungstic acid into the extract and filtering the resultant solution, then treating the residue with barium hydrate, then removing the barium content of the solution, and concentrating the remaining liquid.

6. The process which consists in propagating a fungus growth upon a culture medium, then extracting the vitamine and other soluble substances contained in the mass, then mixing white earth and phosphotungstic acid into the extract and filtering the resultant solution, then treating the residue with barium hydrate, then removing the barium content of the solution, and precipitating the remaining liquid with acetate of lead, then purifying with a solvent and removing the lead content of the supernatant liquid with hydrogen sulphite gas, and precipitating the supernatant liquid with ammoniacal silver nitrate, and decomposing the resulting vitamine compound to remove the metallic element thereof.

7. The process which consists in propagating a fungus growth upon a culture medium, then extracting the vitamine product and other soluble substances contained in the mass, then mixing an inert substance into the extract and filtering the resultant solution, then treating the residue with barium hydrate and removing the barium content of the solution, then precipitating the remaining liquid with acetate of lead, and then removing the lead content of the supernatant liquid, and purifying with a solvent, and forming a metallic vitamine compound from the vitamine content of the supernatant liquid, and then removing the metallic element of said compound with hydrogen sulphide gas, and filtering and concentrating the resulting liquid.

8. The process which consists in propagating a fungus growth of vegetable origin to a stage of immaturity, then extracting the same with a solvent, and removing the vitamine contents of the extracts, and finally purifying the removed vitamine product.

9. The process of obtaining vitamines which consists in propagating a vegetable fungus upon a culture medium, then extracting the vitamine and other water soluble products contained in the resulting mass, then mixing into the extract an inert absorbent substance and precipitating agent, then filtering the solution, and adding to the residue an aqueous barium solution, and then adding an ester to remove the barium.

10. The process which consists in propagating a fungus growth upon a culture medium, then extracting the vitamine and other soluble substances contained in the mass, then mixing into the extract an inert absorbent substance and precipitating agent, and filtering the resultant solution, then adding barium hydrate to the residue, then removing the barium contained in the resulting solution, and then precipitating with an acetic acid aqueous solution of acetate of lead, and removing the precipitant from the supernatant liquid, and then separating excess of lead from the supernatant liquid, and then purifying the resultant liquid with alcohol and filtering the same, and finally treating the residue with acetone.

11. The process which consists in propagating a fungus growth upon a culture medium, and extracting the vitamine and other soluble substances contained in the mass, then separating the vitamine substances from the liquid and treating the same with barium hydrate, then removing the barium content of the resulting solution and precipitating the solution with acetate of lead, then removing the lead content from the supernatant liquid and precipitating said liquid with a silver nitrate, and finally removing the metallic content from the resulting compound.

In testimony whereof we have hereunto set our hands on this 19th day of December, 1923, the 31st day of March, 1924, and the 6th day of March, 1924, respectively.

JOKICHI TAKAMINE, Deceased,
By CAROLINE TAKAMINE,
*Administratrix of the Estate of Jokichi Takamine, Deceased.*

JOKICHI TAKAMINE, Jr.,
N. FUJITA.